Patented May 23, 1944

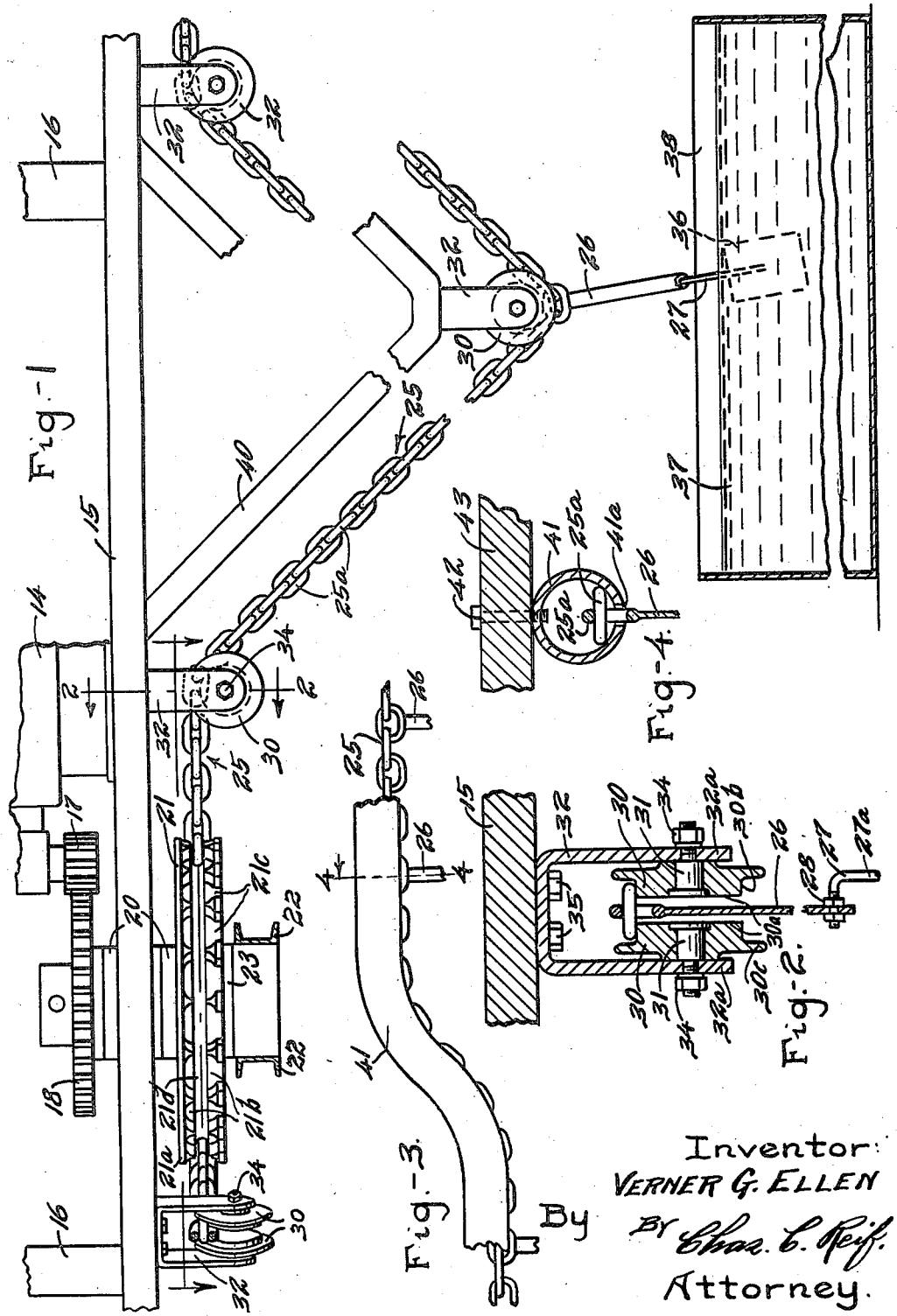

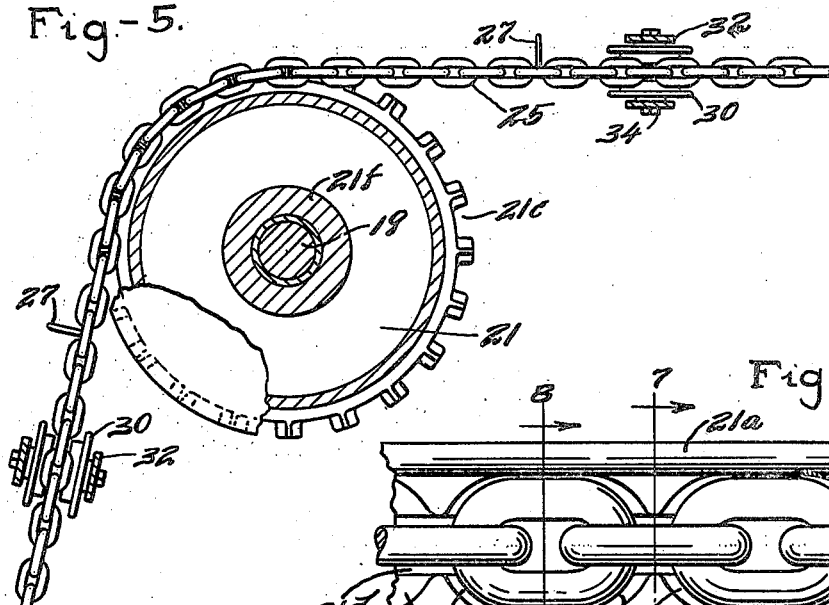
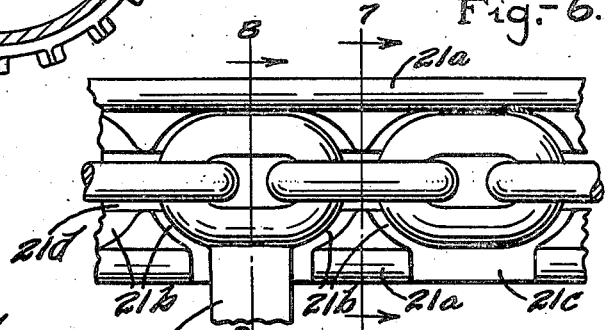
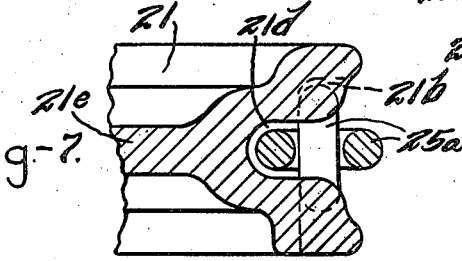
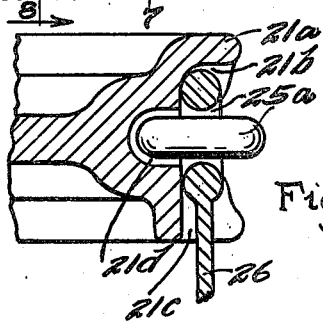
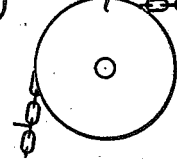
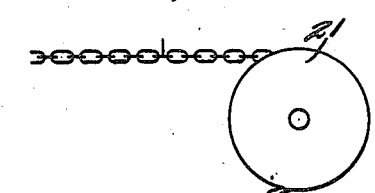
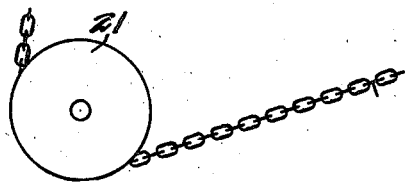

2,349,578

UNITED STATES PATENT OFFICE 2,349,578

CONVEYING MECHANISM

Verner G. Ellen, Medicine Lake, Minn.

Application April 27, 1942, Serial No. 440,570

3 Claims. (Cl. 198—177)

This invention relates to a conveyor and particularly to a conveyor comprising an endless member which may travel through one or more rooms and at different heights to carry articles preferably in a suspended position.

Heretofore the common form of such conveyors was to have a pair of beams or flanged members with rollers supported on the flanges and connected therebeneath so as to form a movable carrier. Such conveyors using the beams are quite expensive and require much labor and forming of the parts in their construction.

It is an object of this invention to provide a very simple and efficient conveyor by means of which articles may be carried from one point to another in suspended position, which conveyor does not require the use of beams extending throughout its length.

It is a further object of the invention to provide a conveyor by means of which articles may be carried from one point to another on a depending support comprising a chain formed of simple looped links, the adjacent links being disposed in planes at right angles to each other together with novel means for supporting and guiding said chain.

It is also an object of the invention to provide a conveyor comprising an endless chain formed of loop links, spaced supporting means for said chain, each comprising a pair of spaced revoluble members having surfaces upon which the horizontally disposed links may ride and be supported, the vertically disposed links passing between said members, said members preferably having flanges between which the horizontally disposed links move.

It is more specifically an object of the invention to provide a conveyor comprising an endless chain formed of looped links disposed in planes at right angles to each other, certain of said links having supporting members secured to and depending therefrom, spaced revoluble supporting means for said chain on which the links disposed horizontally may ride and between which the links disposed vertically and said supporting members may pass together with a means for moving said chain comprising a sprocket having circumferentially spaced recesses receiving alternate links, having a central groove for receiving the other links and having spaced openings at one side for accommodating said supporting members.

These and other objects and advantages of the invention will be fully set forth in the following description made in connection with the accompanying drawings in which like reference characters refer to similar parts throughout the several views and in which—

Fig. 1 is a partial view in side elevation of said conveyor, certain parts being broken away;

Fig. 2 is a vertical section taken on line 2—2 of Fig. 1 as indicated by the arrows;

Fig. 3 is a view in side elevation showing a portion of the guiding means;

Fig. 4 is a vertical section taken on line 4—4 of Fig. 3 as indicated by the arrow;

Fig. 5 is a plan view of a portion of the conveyor, certain parts being broken away and others shown in horizontal section;

Fig. 6 is a partial side view of the parts shown in Fig. 5;

Fig. 7 is a vertical section taken on line 7—7 of Fig. 6 as indicated by the arrows;

Fig. 8 is a vertical section taken on line 8—8 of Fig. 6 as indicated by the arrows; and Fig. 9 is a diagrammatic plan view of the conveyor, certain parts being broken away.

Referring to the drawings, a conveyor structure is shown comprising a horizontal supporting means or member 15. Member 15 could be part of the building structure or it could be a separate frame member suspended from the ceiling or other part of the building by the vertical members 16. A motor 14, part of which is shown in Fig. 1, could be supported upon a suitable support such as member 15 and said motor could, through a reducing mechanism drive a shaft to which is secured a pinion 17. Pinion 17 meshes with a spur gear 18 carried on a shaft 19 journalled in suitable brackets 20 and to the lower end of which is secured a sprocket wheel 21. Beams or brackets 22 are shown, which could be supported from member 15, and support additional bearing brackets 23 for the shaft of sprocket 21. Sprocket 21 is illustrated as having peripheral flanges 21a between which are formed a series of oblong or elliptical recesses 21b. One of the flanges 21a shown as the lower flange, is provided with a multiplicity of slots or openings 21c which communicate with the recesses 21b as clearly shown in Fig. 6. Sprocket 21 also has a central groove 21d and is illustrated as having a central or radial web 21e extending to its hub 21f. A chain 25 is used and while this might take different forms, in the embodiment of the invention illustrated it is shown as comprising simple loop links 25a. The adjacent links 25a are disposed in planes substantially at right angles to each other. Some of the links could thus be in horizontal planes and some in vertical planes. It will be seen that the links in vertical planes may fit into and be received in the recesses 21b while the links in horizontal planes are received in the central groove 21d. Secured to certain of the links as shown, the links disposed in vertical planes are supporting rods 26 which depend from said links and are adapted to have secured thereto article carriers 27. While these article carriers may take various forms, a portion of one is shown as a rod having a horizontally disposed threaded end extending through rod 26 and equipped at either side thereof with nuts 28. Carrier 27 has a vertically depending portion 27a. It is desirable to guide chain 25 for movement at various heights and through various paths to carry articles from one place to another and to move these articles into and out of certain receptacles. For the purpose of so supporting chain 25 supporting means are provided and while these might take various forms, in the embodiment of the invention illustrated they are shown as rollers 30. Rollers 30 are laterally spaced so as to have spaced adjacent faces or surfaces 30a. Said rollers also have peripheral surfaces 30b and are preferably provided with peripheral flanges 30c at the remote portions of surfaces 30b. Rollers 30 are shown as supported and journalled upon studs 31 having reduced portions extending through the sides 32a of a U-shaped bracket 32. The outer ends of studs 31 are threaded and equipped with washers and nuts 34. Bracket 32 is secured by bolts 35 to member 15 or to any suitable support for properly guiding chain 25. It is often desirable to carry an article such as article 36 shown in Fig. 1 through a bath of liquid 37 shown as contained in the receptacle 38. A bracket 40 can be used of general V-shape secured at its upper end to a suitable support such as member 15 and having one bracket 32 secured to its lower or apex end. Other brackets 32 are disposed adjacent the upper ends of bracket 40. It often is desired to guide the chain in a circuitous route and around corners. For this purpose a tubular guide 41 can be provided secured in any suitable manner as by a bolt 42 to a support 43 and chain 25 moves through said guide. Tubular member 41 is provided at its lower side with a slot 41a through which the links disposed in a vertical plane as well as the supporting rods 26, may pass. The links 25a disposed in a horizontal plane may ride against the inside surface of tubular guide 41 as shown in Fig. 4. The chain 25 will be an endless chain and will be guided about a plurality of the sprockets 21 as shown in Fig. 9. It will be only necessary of course, to drive one of said sprockets.

In operation one of the sprockets 21 will be driven and this sprocket will engage the links disposed in vertical planes which seat in the recess 21b so that said chain will be moved or propelled. As stated, the links disposed in horizontal planes will be received in the central groove 21d and rods 26 will depend through the slots 21c. As the chain moves along on its supporting rollers 39 the links disposed in horizontal planes will ride upon the annular surfaces 30b as shown in Fig. 2. The links 25a in vertical planes together with rods 26 will pass between rollers 30. It will thus be seen that chain 25 can move along through the desired path. It can be guided through the tubular containers 41 at certain points without supplying additional supporting rollers 30. By means of the conveyor, articles may be moved as desired in a plant, restaurant, kitchen or other establishment, either in suspended or other position. Rods 26 and carriers 27 can carry baskets or other containers which may receive one or more articles of various kinds. Where articles are progressed through a plant to be dipped in various liquids and sprayed by means of spray guns they can be moved conveniently and efficiently by the chain 25. The arrangement in Fig. 1 shows how an article can be carried down into and out of a tank containing liquid. A chain tightener of any well known or commercial type can be used for preserving the proper tension on chain 25. Such tighteners are well known and are of commerce and it is not deemed necessary to illustrate the same.

From the above description it will be seen that I have provided a simple yet very efficient conveyor by means of which articles may be moved through most any desired path. The structure is simple and is quite inexpensive compared to the conveyors of the prior art used for a similar purpose. All of the structure is quite rugged, the parts are all held firmly in proper position and there is little trouble or expense for maintenance. The conveyor has been installed in actual practice in several establishments and found to be very successful and efficient.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A conveyor structure having in combination, an endless chain formed of looped links adjacent links being disposed at right angles to each other so that some of the same may lie in horizontal planes and some in vertical planes, certain of said links having supporting rods secured thereto and depending therefrom in substantially the plane of the link, means for moving said chain including a driving sprocket, a plurality of aligned pairs of supporting pulleys around which said chain runs, said pairs being disposed at different heights, each of said pairs comprising laterally spaced pulleys having adjacent smooth cylindrical surfaces on which the bottom sides of the horizontally disposed links of said chain ride and having smooth vertical flanges at their remote sides between which said horizontally disposed links are guided, and means at the outer side of said pulleys for supporting the same whereby said chain can pass upwardly and downwardly between said pairs of pulleys and said rods may pass between the pulleys of each pair.

2. The structure set forth in claim 1, said means comprising an inverted U-shaped bracket having sides at the outer sides of said pulleys and shafts secured in said bracket on which said pulleys are journalled.

3. The structure set forth in claim 1, and a cylindrical tubular guide having an internal diameter slightly greater than the transverse dimension of said links, said guide being of bent or angular formation and having a slot in its lower side, said horizontally disposed links being supported on the inner surface of said guide above and at each side of said slot and said vertically disposed links and rods projecting through said slot.

VERNER G. ELLEN.